United States Patent

Rosen

[11] Patent Number: 5,859,896
[45] Date of Patent: Jan. 12, 1999

[54] TELEPHONE LINE AUTOMATIC PREFIX DIALER

[76] Inventor: Howard B. Rosen, 1 Lyncroft Rd., Montreal, Quebec, Canada, H3X 3E3

[21] Appl. No.: 811,710

[22] Filed: Mar. 5, 1997

[51] Int. Cl.[6] .................................................. H04M 1/00
[52] U.S. Cl. ......................... 379/350; 379/199; 379/355; 379/356
[58] Field of Search .................................. 379/199, 200, 379/350, 354, 355, 356

[56] References Cited

U.S. PATENT DOCUMENTS 5,157,719   10/1992   Waldman ................................. 379/356
5,309,508   5/1994   Rosen ..................................... 379/142

Primary Examiner—Fan S. Tsang
Assistant Examiner—Shih-wen Hsieh
Attorney, Agent, or Firm—James H. Phillips

[57] ABSTRACT

Apparatus for eliminating the necessity for manually dialing a local area code as a prefix to a call within the same area code in telephone systems in which such action is a requirement. An automatic dialer is activated and immediately transmits the local area code onto the caller's telephone line when an off-hook condition is sensed; e.g., when a telephone handset is picked up. Thus, the caller can merely then dial an ordinary seven digit telephone number within the local area code. In order to provide for the selective dialing of long distance, when the caller "flashes" his line within a predetermined period (typically, a few seconds) after picking it up, a hang-up followed by a second off-hook is emulated; however, the automatic dialer is inhibited from again transmitting the area code. Consequently, the caller is presented with a dial tone, and a telephone number, including an area code which may be different from the local area code, may be successfully dialed.

12 Claims, 2 Drawing Sheets

TELEPHONE LINE AUTOMATIC PREFIX DIALER

FIELD OF THE INVENTION

The invention relates to apparatus for automatically dialing a predetermined telephone number prefix, such as an area code, and for selectively overriding the automatic dialer.

BACKGROUND OF THE INVENTION

Local telephone calls have, for many years, been effected by dialing a seven digit code. At one time, all long distance calls were handled by "long lines" operators who more or less manually established a routing for a given call. However, since the late 1950s, direct dial long distance calling has been widely used. Directly dialed long distance calls involve the dialing of a first prefix, typically "1", to indicate to the telephone company apparatus that a long distance call is contemplated, then dialing a second prefix, the three digit area code, before the local seven digit number of the called party is dialed. In this manner, a long distance call can be carried out without the intervention of an operator. Variations of this process, typically dialing longer strings of numbers, permits international long distance direct dialing.

When this system was established, largely under the auspices of American Telephone and Telegraph Company, it was believed that the allocation of possible telephone numbers (including area codes) was adequate to handle all demand for many years. However, it is becoming evident that such is no longer the case. In particular, the remarkable proliferation in dedicated line demand for fax machines and the like, and, especially, for modems which may be used, inter alia, for connecting a computer to the Internet and other networks, has pushed the allocation of available lines, notwithstanding the application of various technological advances, to near the limit possible with the current system.

One technological advance which promises to alleviate this problem for a number of years is to require a calling party to dial the area code of a called party even when the two parties are within a common area code. Thus, one would be required to dial a ten digit code even if the called party is next door. It will be readily apparent that this change will be highly inconvenient to many persons who wish to continue the use of the traditional seven digit dialing for local calls. Accordingly it will be understood that a method and apparatus which, in such a contemplated modified telephone dialing system, permits the ongoing use of standard seven digit dialing for routine local calls would be highly desirable, and it is to this end that the present invention is directed.

OBJECTS OF THE INVENTION

It is therefore an object of the invention to provide an automatic prefix dialer which eliminates the necessity for a calling party to dial any predetermined code, such as an area code, prior to entering the called party's local telephone number.

It is a more specific object of the invention to provide apparatus which automatically dials the predetermined code before the calling party dials the telephone number of the receiving party.

In another aspect, it is an object of the invention to provide such apparatus which includes a feature which permits the dialing of the predetermined code to be selectively overridden when appropriate such as when a long distance call is contemplated.

SUMMARY OF THE INVENTION

Briefly, these and other objects of the invention are achieved by apparatus, in which an automatic dialer is activated and immediately transmits the local area code onto the caller's telephone line when an off-hook condition is sensed; e.g., when a telephone handset is picked up. Thus, the caller can merely then dial an ordinary seven digit telephone number within the local area code. In order to provide for the selective dialing of long distance, when the caller "flashes" his line within a predetermined period (typically, a few seconds) after picking it up, a hang-up followed by a second off-hook is emulated; however, the automatic dialer is inhibited from again transmitting the area code. Consequently, the caller is presented with a dial tone, and a telephone number, including an area code which may be different from the local area code, may be successfully dialed.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(s)

Figure 1:
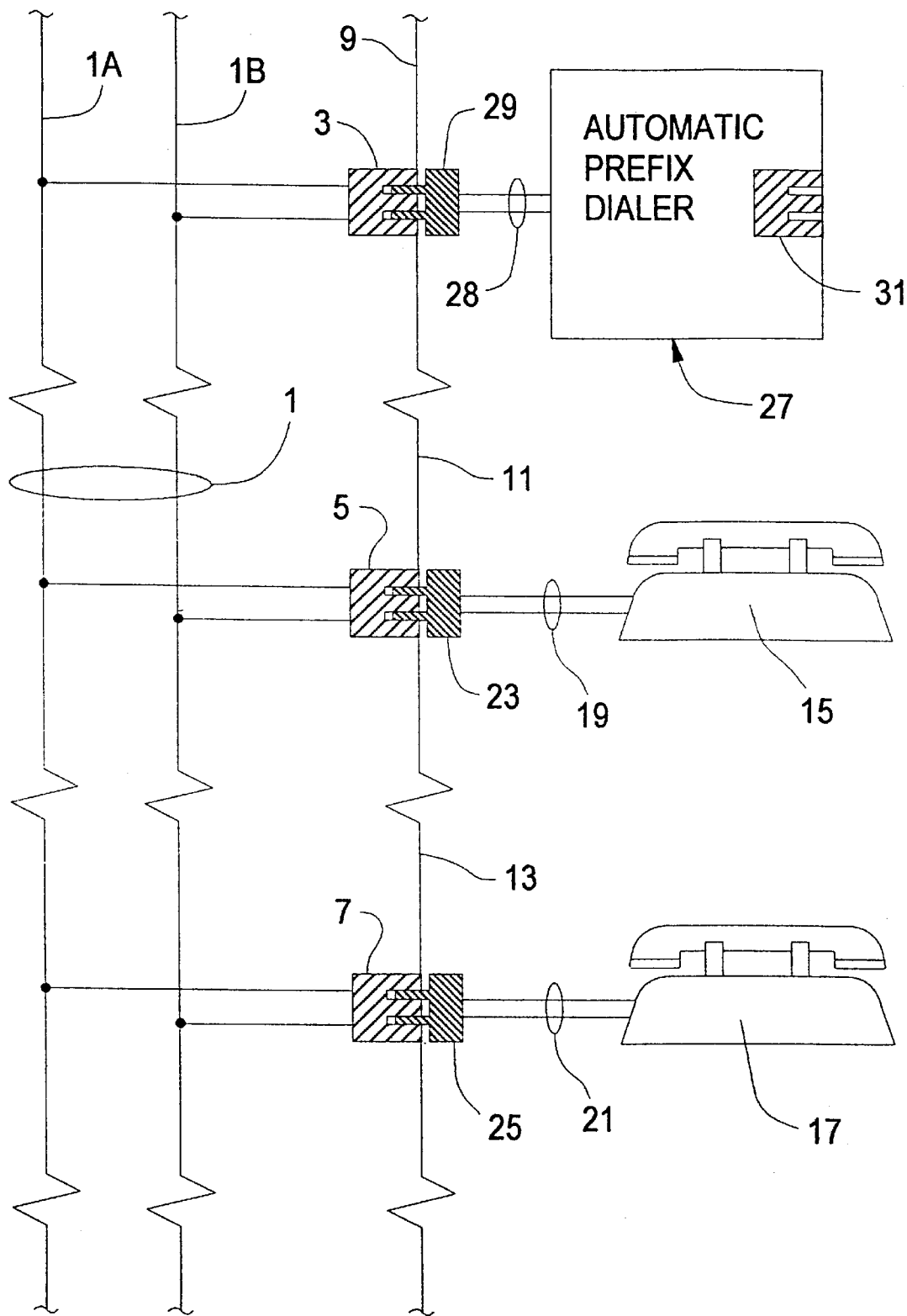
FIG. 1 illustrates a telephone arrangement into which the inventive apparatus is connected.

Referring to FIG. 1 for a description of a representative environment in which the invention finds particular use, a telephone line 1, consisting of wires 1A and 1B, is connected to a plurality of sockets 3, 5 and 7, mounted on walls 9, 11 and 13, respectively, in a household. Telephones 15 and 17 are connected, via lines 19 and 21, respectively, to plugs 23 and 25 which are plugged into sockets 5 and 7, whereby the telephones 15 and 17 are conventionally connected to the telephone line 1. Although FIG. 1 illustrates a situation in which a single line services a plurality of telephones, the invention is equally applicable when the telephone line services only a single telephone as will be discussed below.

The automatic prefix dialer unit apparatus in accordance with the invention is illustrated generally at 27 in FIG. 1 and includes a plug 29, which mates with the socket 3, and a socket 31 which is similar to the socket 3. If the apparatus is remotely located from the socket 3, line pair 28 couples the prefix dialer unit 27 to the plug 29 as will be evident from FIG. 1. In addition, if the telephone line is servicing only a single telephone, then that telephone can be plugged into socket 31 of the prefix dialer unit 27. In fact, this would be possible even when the line 1 is servicing a plurality of telephone lines. This feature eliminates the possibility that a socket will have to be used solely for the prefix dialer unit 27. That is, in accordance with one aspect of the invention, both the inventive apparatus 27 and a telephone can be plugged into the same socket 3.

Figure 2:
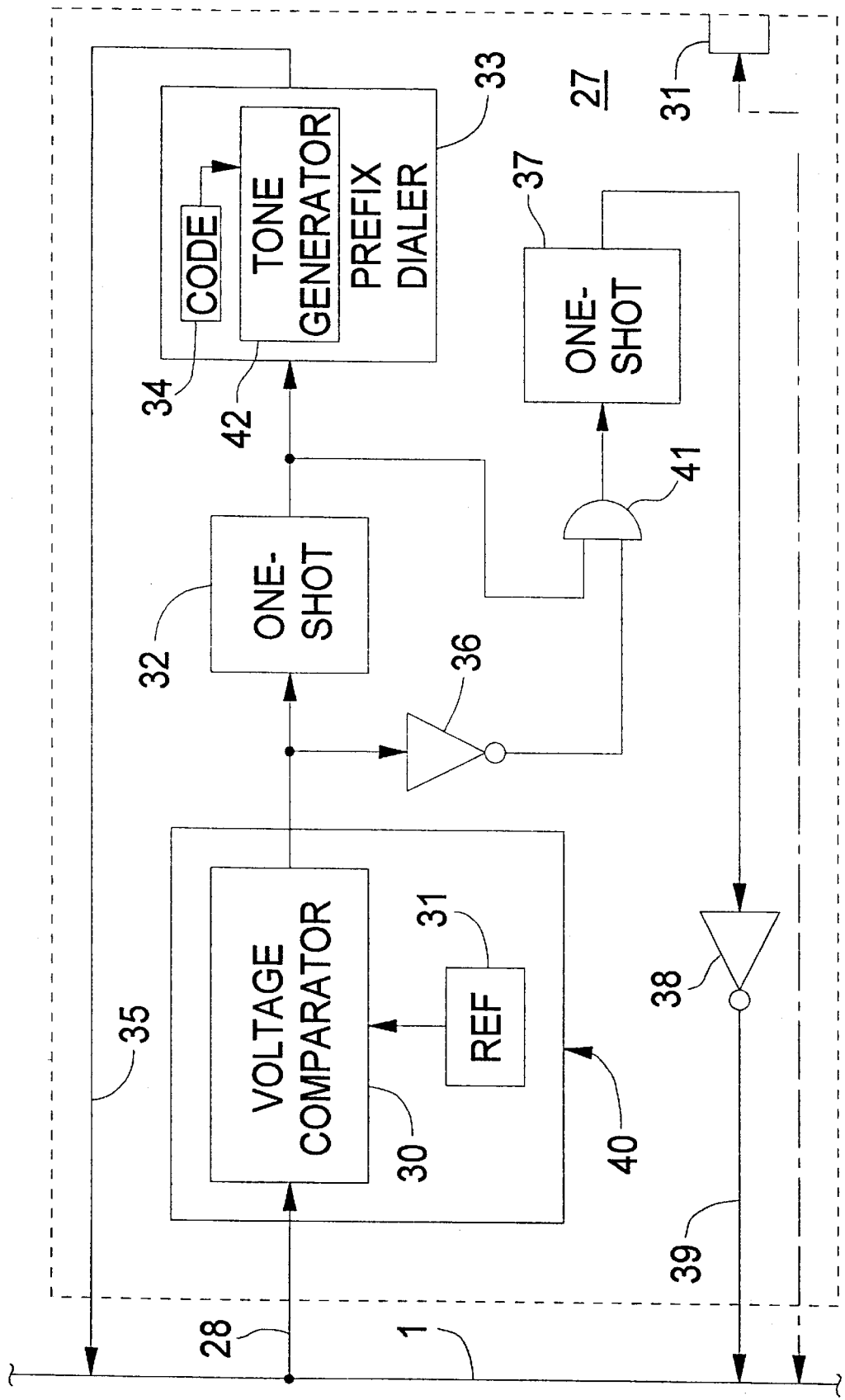
FIG. 2 is a schematic block diagram of an exemplary embodiment of the inventive apparatus.

Attention is now directed to FIG. 2 which is a block diagram of an exemplary embodiment of the prefix dialer unit 27. (It will be understood by those skilled in he art that a physical implementation of the invention may take diverse forms.) For clarity, the circuitry illustrated in FIG. 2 is shown single ended, it being understood that a voltage reference, e.g., ground potential, is conventionally maintained throughout the circuitry.

Thus, in FIG. 2, the automatic prefix dialer unit 27 includes an off-hook detector 40 which, for example, employs a d-c voltage comparator 30 having a signal input connected to the telephone line 1 and a reference input which is fed with a reference voltage from a suitable source 31. As is well known in the art, when the line changes from an on-hook to an off-hook condition, as when one of the telephones 15, 17 (FIG. 1) is picked up, there is a consequent change in voltage—usually a decrease in voltage—across the line. This change is detected by comparator 30 which compares the voltage on the line with the reference voltage. Other arrangements could be used to detect the off-hook condition as well known in the art.

The output of the off-hook detector 30 is fed to the input of a first one-shot 32. When an off-hook condition is detected by the off-hook detector 40, a triggering signal is sent to the one-shot 32 which responds by issuing an output pulse of predetermined (by the selection of timing components as well known in the art) time length to a prefix dialer 33. A predetermined code, which, in the example, is the local three digit area code, is stored in a memory 34 in the prefix dialer 33.

The prefix dialer 33 responds to the leading edge of the output pulse from the one-shot 32 by dialing the predetermined code stored in memory 34, e.g., the local area code, to relieve the calling party from the necessity of taking this step while placing a local call. This is achieved by using the predetermined code to activate a conventional tone sequencer 42 which sends, via line 35, the appropriate tone sequence to the telephone line 1. (While a conventional pulse dialer can be used in place of the tone sequencer 42, the latter is preferred because it operates much more quickly.)

The automatic prefix dialer unit 27 responds sufficiently quickly to the sensed off-hook condition that the prefix dialing action of the dialer 33 is essentially transparent to the calling party. Accordingly, the predetermined code is automatically dialed each time the receiver of the telephone is lifted (or other appropriate action taken) to place the telephone line in an off-hook condition. Thus, the calling party does not have to go through the inconvenience of dialing the predetermined code each time a local call is made, nor is it possible for the calling party to inadvertently dial a local number without the predetermined code first having been dialed.

However, provision must be made for direct dialing a long distance number when desired, and the apparatus as described so far renders this operation impossible if it is the local area code which is stored in memory 34 which is the presently intended use of the subject invention. Still referring to FIG. 2, and, for convenience, assuming positive logic throughout, a positive signal (logic "1") from the off-hook detector 40, indicating that a telephone on the line has been picked up, triggers the one-shot 32 which issues a positive pulse (logic "1") to the prefix dialer 33 to initiate the dialing of the predetermined code stored in memory 34 as previously described. In addition, the output of the one-shot 32 is also connected to a first input of an AND-gate 41 and thus, at this time, delivers a logic "1" signal thereto until the one-shot 32 times out. Further, the output from the off-hook detector 40 is also connected to the input of an inverter 36. Thus, when the off-hook action is taken, a logic "1"0 signal is applied to the input of the inverter 36 such that its output is logic "0". The output of inverter 36 is connected to a second input to AND-gate 41 which is therefore not enabled under the conditions just described. The output of AND-gate 41 is connected to the trigger input of a second one-shot 37 which will therefore only be triggered when the AND-gate 41 is fully enabled.

The first one-shot 32 is configured to be non-retriggerable (i.e., application of a second trigger pulse while its output pulse is still logic "1" has no effect on the time length of the first output pulse) and to have a time out which may be on the order of five to ten seconds, even though the prefix dialing operation rapidly takes place early in this time period. The second one-shot 37, however, has a substantially shorter time out which is greater than about 0.8 second, and is preferably about one to two seconds.

Consider now the operation of the apparatus when a user "flashes" the telephone handset shortly after picking it up; i.e., when the user quickly depresses and releases the flash hook plunger (or accordingly activates the corresponding device on a telephone which does not have a plunger) for less than about 0.8 second. If this step is taken before the first one-shot 32 has timed out, the prefix stored in memory 34 will already have been dialed by the prefix dialer 33, but the first input to the AND-ate 41 remains at logic "1".

When the user "flashes" the telephone, the output of the off-hook detector 40 briefly transitions to logic "0" and then back to logic "1". This second transition has no effect on the time out of the first one-shot 32 because it is configured as non-retriggerable. However, the first transition causes the output of the inverter, and hence, the second input to AND-gate 41 to briefly change to logic "1" which fully enables the AND-gate 41 to trigger the second one-shot 37. The output pulse from the second one-shot 37 is applied to the input of an inverting amplifier 38 which serves, during the time out period of the second one-shot 37, to place, via line 39, a suitable voltage on the line 1 to emulate a manual hang-up; i.e., to emulate an off-hook to on-hook transition. When the second one-shot 37 times out, the emulated hang-up condition is removed, and a dial tone is heard in the telephone handset. However, there is no action taken by the prefix dialer 33 as the one-shot 32 did not time out before the emulated hang-up operation was completed (which causes another trigger pulse to be applied, without effect, to the input of one-shot 32). The user is then free to dial the fill long distance code desired from the telephone hand set, a result obtained by merely "flashing" the telephone shortly after picking up the handset or taking equivalent action with other types of telephones.

In the illustrated embodiment, the automatic prefix dialer unit 27 has been described as a separate unit. It is also within the scope of the invention to incorporate the elements of device 27 in the telephone instrument (15 or 17) so that it forms a part of the instrument.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. Apparatus for automatically dialing a predetermined code when a calling party institutes a call on a telephone network and for selectively canceling the effect of automatically dialing the predetermined code, the apparatus comprising:

A) an off-hook detector having an input and an output, said input of said off-hook detector being connected to the telephone line of the calling party to detect an off-hook condition on the telephone line of the calling party and to provide an initiating signal at said off-hook detector output upon detection of an off-hook condition;

B) a first time period determination circuit having an input connected to said output of said off-hook detector and responding to the presence of a first initiating signal by starting a first time period;

C) an automatic dialer having an input and an output and storing a predetermined code, said automatic dialer input being connected to said first time period determination circuit and said automatic dialer output being connected to the telephone line of the calling party;

1) said automatic dialer being responsive to the starting of the first time period by dialing the stored predetermined code, thereby automatically applying the stored predetermined code to the telephone line of the calling party before the calling party dials the telephone number of a receiving party;

D) a second time period determination circuit having an input coupled to said output of said off-hook detector and responding to the presence of an initiating signal occurring during the first time period by starting a second time period;

E) said second time period determination circuit having an output coupled to the telephone line of the calling party such that, during the second time period, a hang-up condition is emulated on the telephone line of the calling party and, at the end of the second time period, when within the first time period, an off-hook condition is again detected by said off-hook detector, such that a second initiation signal is applied to said input of said first time period determination circuit; and F) said first time period determination circuit including means for inhibiting said second initiating signal from extending the first time period;

whereby, if the calling party flashes the telephone line within the first time period and after the predetermined code has been dialed by the automatic dialer, a new dial tone is obtained and the caller can manually enter a telephone number which may include a prefix code different from the predetermined code.

2. The apparatus of claim 1 in which the predetermined code is the area code of the calling party.

3. The apparatus of claim 1 in which the second time period is at least 0.8 second and is shorter than the first time period.

4. The apparatus of claim 1 in which the first time period is within the range of five to ten seconds.

5. The apparatus of claim 4 in which the second time period is within the range of one to two seconds.

6. The apparatus of claim 3 in which the predetermined code is the area code of the calling party.

7. The apparatus of claim 4 in which the predetermined code is the area code of the calling party.

8. The apparatus of claim 5 in which the predetermined code is the area code of the calling party.

9. The apparatus of claim 1 in which said first time period determination circuit comprises a non-retriggerable one-shot which is triggered by the initiating signal and issues an output pulse for the first time period.

10. The apparatus of claim 9 in which said second time period determination circuit comprises a one-shot which is triggered by the initiating signal if the initiating signal occurs while the output pulse from the first time period determination circuit is present and issues an output pulse for the second time period.

11. The apparatus of claim 9 in which the predetermined code is the area code of the calling party.

12. The apparatus of claim 10 in which the predetermined code is the area code of the calling party.

* * * * *